(12) United States Patent
Wendte et al.

(10) Patent No.: US 9,596,803 B2
(45) Date of Patent: Mar. 21, 2017

(54) AGRICULTURAL IMPLEMENT WITH SYSTEM FOR SEEDING OR PLANTING MULTIPLE SEED TYPES

(71) Applicant: CNH Industrial America LLC, New Holland, PA (US)

(72) Inventors: Keith W. Wendte, Willowbrook, IL (US); Brian T. Adams, Centralia, MO (US)

(73) Assignee: CNH Industrial America LLC, New Holland, PA (US)

( * ) Notice: Subject to any disclaimer, the term of this patent is extended or adjusted under 35 U.S.C. 154(b) by 40 days.

(21) Appl. No.: 14/506,020

(22) Filed: Oct. 3, 2014

(65) Prior Publication Data

US 2016/0095274 A1 Apr. 7, 2016

(51) Int. Cl.
| | | |
|---|---|---|
| *A01C 7/08* | (2006.01) | |
| *A01C 21/00* | (2006.01) | |
| *A01B 79/02* | (2006.01) | |
| *A01B 79/00* | (2006.01) | |

(52) U.S. Cl.
CPC .......... *A01C 21/005* (2013.01); *A01B 79/005* (2013.01); *A01C 7/081* (2013.01)

(58) Field of Classification Search
CPC ....... A01C 7/082; A01C 7/084; A01C 21/005; A01C 7/081; A01B 79/005
USPC .................................. 111/179, 183, 184, 185
See application file for complete search history.

(56) References Cited

U.S. PATENT DOCUMENTS

| | | |
|---|---|---|
| 4,100,538 A | 7/1978 | Knepler |
| 4,159,064 A | 6/1979 | Hood |
| 4,225,930 A | 9/1980 | Stefdfen |
| 4,307,390 A | 12/1981 | Steffen et al. |
| 4,630,773 A | 12/1986 | Ortlip |
| 4,697,173 A | 9/1987 | Stokes |
| 4,710,757 A | 12/1987 | Haase |
| 5,301,848 A | 4/1994 | Conrad et al. |
| 5,924,371 A | 7/1999 | Flamme et al. |
| 6,070,539 A | 6/2000 | Flamme et al. |
| 6,494,154 B2 | 12/2002 | Kinzenbaw et al. |
| 8,942,894 B2 | 1/2015 | Garner et al. |
| 8,948,980 B2 | 2/2015 | Garner et al. |
| 2011/0178632 A1* | 7/2011 | Straeter ............ A01C 7/10 700/219 |

(Continued)

FOREIGN PATENT DOCUMENTS

JP WO9103148 3/1991

OTHER PUBLICATIONS http://www.google.com/url?sa=t&rct=j&q=&esrc=s&frm=1&source=web&cd=2&ved=0CCwQFjAB&url=http%3A%2F%2Fwww.caseih.com%2Fen_us%2Fpressroom%2Fnews%2Fdocuments%2F2013-8-26-new_case.

(Continued)

*Primary Examiner* — John G Weiss
(74) *Attorney, Agent, or Firm* — Rebecca L. Henkel; Rickard K. DeMille

(57) ABSTRACT

A system is provided for use with a seed-delivering agricultural implement that can use look-ahead predictions and controls to coordinate seed type delivery switchover in a manner that minimizes mixing different seed types during the switchover. The system can include a control system that uses a prescription map to look ahead to coordinate out-of-implement or to-ground seed type delivery switch-over events of seeding and/or planting implements with the implements crossing boundaries between different variety zones of an agricultural field.

20 Claims, 10 Drawing Sheets

(56) References Cited

U.S. PATENT DOCUMENTS

| | | |
|---|---|---|
| 2012/0036914 A1 | 2/2012 | Landphair et al. |
| 2014/0165890 A1 | 6/2014 | Graham |
| 2014/0174330 A1 | 6/2014 | Garner et al. |
| 2015/0059629 A1* | 3/2015 | Kinzenbaw ............ A01C 7/044 |
| | | 111/200 |

OTHER PUBLICATIONS http://www.kinze.com/filesimages/Literature/KINZE_Planter. 2013RevisedLR.pdf.

http://www.white-planters.com/Library/upload/white-planters-8000-series-brochure-english.pdf; White Planters 8000 Series brochure; Oct. 2013.

* cited by examiner

AGRICULTURAL IMPLEMENT WITH SYSTEM FOR SEEDING OR PLANTING MULTIPLE SEED TYPES

FIELD OF THE INVENTION

The invention relates generally to seeders or row-crop planters or and, in particular, seeders and planters for planting multiple varieties of seed with a single implement.

BACKGROUND OF THE INVENTION

Modern farming practices strive to increase yields of agricultural fields. Technological advances of planters allow for better agronomic characteristics at the time of planting, such as providing more accurate seed depth, improved uniformity of seed depth across the planter, and improved accuracy of in-row seed spacing. However, a single field can have performance inconsistencies between different areas. That is because a field can have a wide variety of soil types and management zones such as irrigated and non-irrigated zones in different areas. Seed companies are developing multiple varieties of each of their seed product types, with the different varieties offering improved performance characteristics for different types of soil and management practices. Efforts have been made to plant multiple varieties of a particular seed product type in different areas of fields with different soil types or management zones. These efforts include seeders with complex valves that change which stored seeds can enter a metering box. Other efforts include planters that have different bulk fill hoppers and require the reservoir for each seed meter to be completely cleaned out or planted out before a different seed variety can be delivered to the seed meters. Some planters allow for planting two varieties and include two separate and distinct seed meters at every row unit.

SUMMARY OF THE INVENTION

The present invention is directed to agricultural implements with systems for seeding or planting multiple seed types. The systems can be implemented with seeders or planters and can use look-ahead predictions and controls to coordinate seed type delivery switchover in a manner that minimizes mixing different seed types during the switchover. In one embodiment, controlling initial primary delivery of seed may be done exclusively through controlling primary metering or deliver from bulk storage by way of a primary delivery system. In one embodiment, this may be done without flow-stopping ancillary gates or valves within a primary or bulk delivery system, but instead by individually controlling primary delivery assemblies such as metering rollers to selectively deliver seeds of different types from bulk storage. In one embodiment, the agricultural implement is a planter with mini-hoppers that receive seeds from bulk storage. Each of the mini-hoppers can be filled with an amount of a particular type of seed needed to plant a zone across which a row unit fed by the respective mini-hopper travels while the planter moves across the field. The mini-hoppers at different row units can be filled with different types of seed depending on which zone of the field, for example, according to a prescription map, that the row unit will be in while the planter moves across the field. The mini-hoppers can have sensors communicating with a control system for filling the mini-hoppers with an amount of seeds of a particular variety needed for planting a particular segment of the field. A control system can look ahead along a travel path that may correspond to a current heading direction of the tractor implement to predict how much of a particular seed type is needed to plant a zone being traveled through along the travel path. In one embodiment, if the required amount can be held in the mini-hoppers, then the entire required amount of seed of that variety is pre-fed to the mini-hoppers during a fill phase and then delivery of seed from bulk storage is halted. A seed-out phase is defined when delivery of seeds from bulk storage is halted and the seeds in the mini-hoppers are delivered to the field, depleting the volume of seeds stored locally on the row units. A subsequent fill phase begins when the implement approaches a boundary between zones of a field and reaches a target distance from the boundary that, based on current or average travel speed, corresponds to a distance traveled over a time period that corresponds to a time required for seeds to travel from bulk storage through the implement to the mini-hoppers.

According to one aspect of the invention, a control system uses a prescription map to look ahead to coordinate out-of-implement or to-ground seed type delivery switch-over events of seeding and/or planting implements with the implements crossing boundaries between different variety zones of an agricultural field. This allows for seeding or planting multiple types of seed, which may include planting at varying rates, in a single planting pass without having to add additional row units or meters.

According to one aspect of the invention, a method is provided for delivering multiple types of seed onto an agricultural field with an agricultural implement. The method includes moving an implement along a travel path through multiple zones including at least a first zone and a second zone of an agricultural field. Each of the multiple zones corresponds to a characteristic of the agricultural field relating to at least one of soil type and management type. Seeds of multiple types are selectively released. The multiple types of seed include at least a first type and a second type that are released from the agricultural implement onto the agricultural field at the first and second zones. Seed delivery is switched from releasing seeds of the first type to releasing seeds of the second type from the agricultural implement at a boundary defined between the first and second zones. This is done by coordinating the switching from releasing seeds of the first to the second type through a controlled predicted exhaustion of seeds of the first type. The coordinating of the switching includes preemptively deactivating a primary delivery system preventing further delivery of the seed to the first type from the bulk storage system before the agricultural implement reaches the boundary. The primary delivery system is preemptively activated to initiate delivery of the seed of the second type from the bulk storage system before the agricultural implement reaches the boundary such that the initial release of the seed on the second type out of the agricultural implement is coordinated with the agricultural implement crossing the boundary between the first and second zones. This allows a control system that controls the primary delivery system to look ahead and plan seed type switchover events, including fully depleting a seed type conveyed through the agricultural implement to be released onto a particular zone at the same time that a different seed type starts its conveyance through the agricultural implement, reducing mixing of the seed types near the boundary between adjacent zones.

According to another aspect of the invention, a required amount is determined for seed of the first or second type needed to deliver onto a portion of the agricultural field while the agricultural implement travels along a travel path through one of the first and second zones. The required amount of the first or second type of seed is delivered with the primary delivery system for temporary storage of the first or second type on the agricultural implement downstream of the bulk storage system during release of the seed of the first or second type onto the agricultural field.

According to another aspect of the invention, the agricultural implement may be a planter having multiple row units with mini-hoppers. Seeds of one of the multiple types are delivered from the bulk storage system to the mini-hoppers and delivery of seeds from the mini-hoppers are delivered to seed meters at the row units for singulation and individual release onto the agricultural field. Seed level sensors are arranged with respect to the mini-hoppers for detecting amounts of seeds in chambers of the mini-hoppers. The primary delivery system is activated to deliver seed of the first or second type to the mini-hoppers until the seed level sensors provide a signal indicating that the required amount of seed of the first or second type is within the mini-hoppers. This allows for batch pre-feeding of the required amount of seed needed for a particular zone during travel along the travel path which will be exhausted by release onto the agricultural field as coordinated with the agricultural implement reaching the boundary between the current and next zone.

According to another aspect of the invention, the primary delivery system includes first and second primary delivery assemblies. The first primary delivery assembly is activated to deliver seeds of the first variety from the bulk storage system for release from the agricultural implement and the second primary delivery assembly is activated to deliver seeds of the second variety from the bulk storage system for release from the agricultural implement. The first and second primary delivery assemblies include rollers that are rotated during activation of the first and second primary delivery assemblies to deliver seeds of the first and second types from the bulk storage system. Rotation of the rollers is stopped when the first and second primary delivery assemblies are deactivating to prevent delivery of the seeds of the respective first and second types out of the corresponding one of the first and second compartments of the bulk storage system. The rollers of the first and second primary delivery assemblies may be arranged in outlets of first and second compartments of the bulk storage system respectively storing seeds of the first and second types.

According to another aspect of the invention, an implement is moved along a travel path through a first zone of an agricultural field that corresponds to a first characteristic of the agricultural field relating to at least one of soil type and management type. A first primary delivery assembly is activated to deliver seeds of a first type from a first compartment of a bulk storage system through the implement for release onto the agricultural field.

An approaching boundary is identified that will be crossed by the agricultural implement moving along the travel path. The boundary is defined between the first zone and a second zone of the agricultural field. The second zone corresponds to a second characteristic of the agricultural field relating to at least one of soil type and management type. The first primary delivery assembly is deactivated before the implement crosses the boundary between the first and second zones to stop delivery of the seeds of the first type from the first compartment through the implement before the implement crosses the boundary between the first and second zones. A second primary delivery assembly is activated to deliver seeds of a second type from a second compartment of a bulk storage system through the implement for initial release onto the agricultural field at a time that corresponds to the implement crossing the boundary between the first and second zones.

According to another aspect of the invention, an agricultural implement is provided for delivering multiple types of seed onto an agricultural field. The implement has a bulk storage system including a first compartment storing seeds of a first type and a second compartment storing seeds of a second type. A primary delivery system includes a first primary delivery assembly arranged with respect to the first compartment to selectively deliver the seeds of the first type through the agricultural implement for release onto the agricultural field and a second primary delivery assembly arranged with respect to the second compartment to selectively deliver the seeds of the second type through the agricultural implement for release onto the agricultural field. A control system is operably connected to the primary delivery system. The control system is configured to activate the first primary delivery assembly while the agricultural implement travels along a travel path through a first zone of an agricultural field, with the first zone corresponding to a first characteristic of the agricultural field relating to at least one of soil type and management type. An approaching boundary is identified to be crossed by the agricultural implement moving along the travel path. The boundary is defined between the first zone and a second zone of the agricultural field that corresponds to a second characteristic of the agricultural field relating to at least one of soil type and management type.

The first primary delivery assembly is deactivated before the agricultural implement crosses the boundary between the first and second zones to stop delivery of the seeds of the first type from the first compartment through the agricultural implement before the agricultural implement crosses the boundary between the first and second zones. The second primary delivery assembly is activated to deliver seeds of the second type from the second compartment through the agricultural implement for initial release of the seeds of the second type onto the agricultural field at a time that corresponds to the agricultural implement crossing the boundary between the first and second zones.

Each of the first and second primary delivery assemblies can include a roller that rotates while the respective first and second primary delivery assembly is activated to deliver the seeds of the respective first and second types out of the corresponding one of the first and second compartments of the bulk storage system. The roller of each of the first and second primary delivery assemblies does not rotate while the respective first and second primary delivery assembly is deactivated to prevent delivery of the seeds of the respective first and second types out of the corresponding one of the first and second compartments of the bulk storage system. The rollers of the first and second primary delivery assemblies are arranged in outlets of the first and second compartments of the bulk storage system.

The agricultural implement can be a planter including an on-row storage system receiving seeds from the primary delivery system and having multiple row units supporting seed meters receiving seeds from the on-row storage system for singulating and delivering the seeds to the agricultural field. The on-row storage system can include mini-hoppers at the multiple row units having chambers receiving seeds from the primary delivery system and providing seeds to the seed meters. The control system can include seed level sensors arranged with respect to the mini-hoppers for detecting amounts of seeds in the chambers of the mini-hoppers. The agricultural implement can be a seeder that may include an air drill and the first and second primary delivery assemblies can include metering boxes having calibrated fluted metering rollers.

In one embodiment, the implement is a planter and when the planter first starts in the field, the bulk tank compartment containing the seed type that is to be planted first feeds the correct amount of seed to each row unit seed meter. This may be done by activating a primary delivery system to deliver a calibrated amount of the seed type to a mini-hopper at each row unit. The amount of seed necessary for each individual row unit can be calculated based on the prescription map PM and the known population. Seed level sensors in the seed reservoir or chamber of the mini-hopper are used to determine the amount of seed in each seed reservoir or chamber. Once the proper amount of seed is fed into the meter reservoir of chamber of the mini-hopper, a gate located at the bulk tank compartment is shut or a roller is deactivated and stopped for that particular row unit. If there is not enough seed in the reservoir or chamber of the mini-hopper to plant this seed type before it has to switch, the gate remains open or the roller remains activated and rotating until the planter reaches a point where the control system determines that the reservoir or chamber of the mini-hopper has enough seed to reach an inter-zone boundary between the current and next zone of the next seed type for that particular row. When the planter row unit reaches the boundary for the next seed type, almost all of the seed in the reservoir or chamber of the mini-hopper, for example, only enough seed to plant about another five feet or less, such as less than about three feet worth of seed remains. As soon as this occurs, the gate for the next seed variety is opened or the roller for the next seed variety is activated to rotate and the process is repeated.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
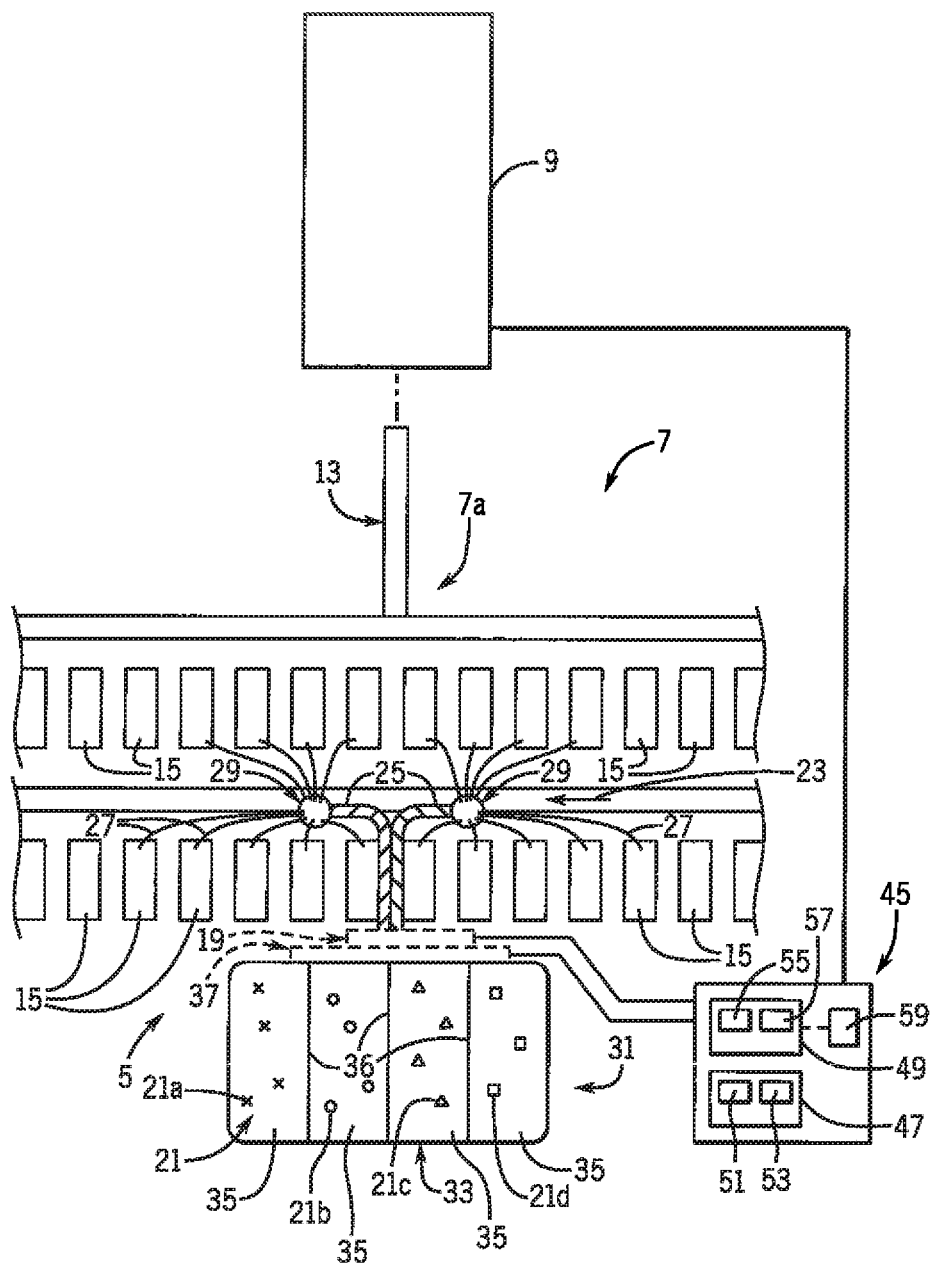
FIG. 1 illustrates a simplified schematic top plan view of a seeder as an implement incorporating a system for predictive switchover of delivery of multiple seed types in accordance with the present invention.
Figure 2:
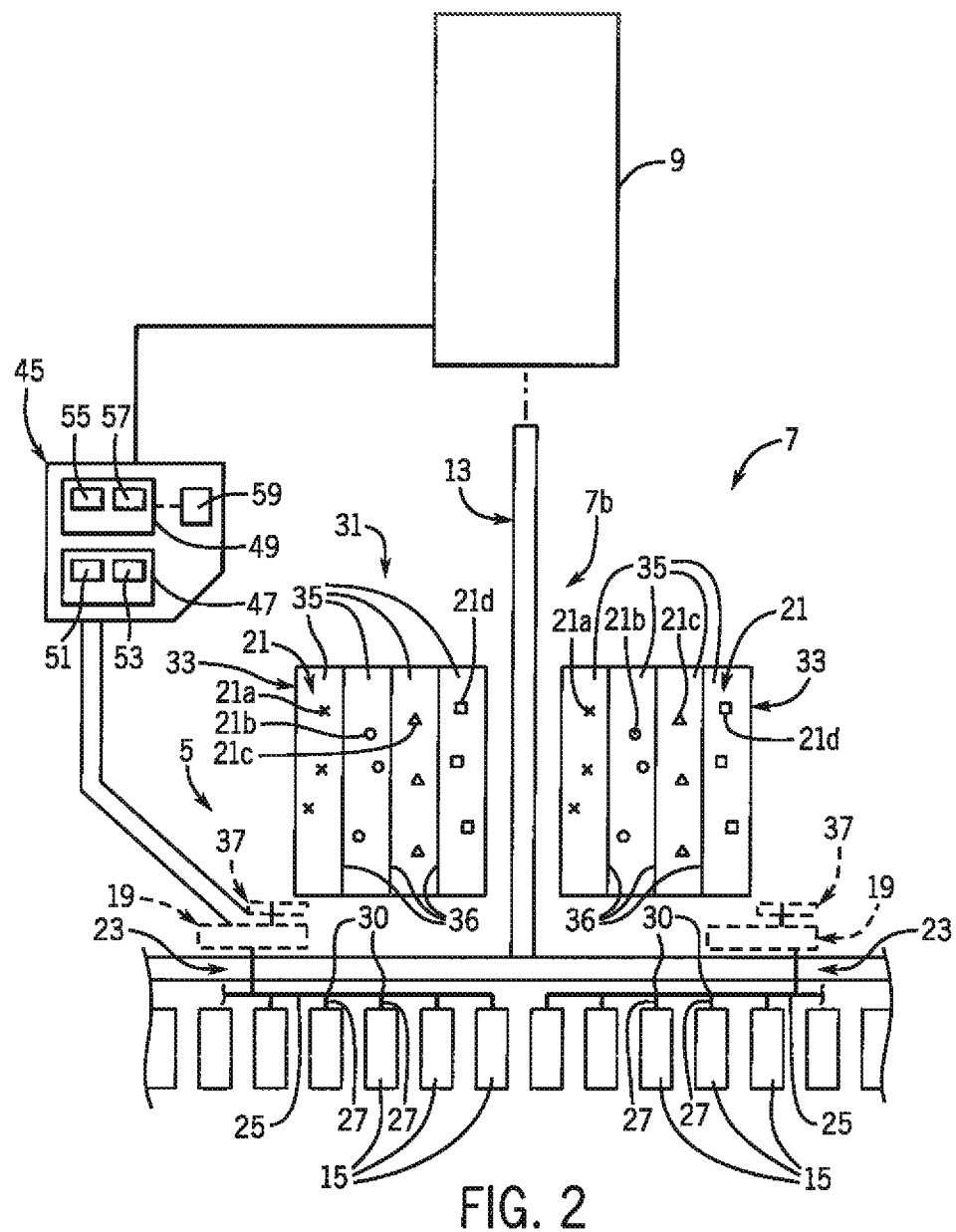
FIG. 2 illustrates a simplified schematic top plan view of a planter as an implement incorporating a system for predictive switchover of delivery of multiple seed types in accordance with the present invention.

Referring now to the drawings and specifically to the simplified schematic representations of FIGS. 1-2, a system 5 is shown that is used with an agricultural implement 7 and is configured for seeding or planting multiple seed types onto different zones of an agricultural field. The system 5 can use look-ahead predictions and controls to coordinate seed type delivery switchover in a manner that minimizes mixing different seed types during the switchover, as explained in greater detail elsewhere herein. Referring now to FIG. 1, in this embodiment, the implement 7 incorporating system 5 is a seeder 7a that may include an air drill, such as an ATX700 air drill available from Case IH, and an air cart, such as a PRECISION AIR® air cart available from Case IH, both towed behind a traction device such as tractor 9. Referring now to FIG. 2, in this embodiment, the implement 7 incorporating system 5 is a planter 7b such as one of the EARLY RISER® series planters available from Case IH and is towed behind tractor 9. Each implement 5 includes a frame 13 that supports multiple row units 15 that are substantially identical. The row units 15 have ground-engaging tools that may include opening and closing mechanisms such as opener disks and closing disks, respectively, or other ground-engaging tools for opening and closing a furrow. The ground-engaging tools may also include a gauge wheel configured for adjusting furrow depth by limiting soil penetration of the furrow-opening mechanism of the ground-engaging tools while creating a furrow, and a press wheel may be arranged to roll over the closed furrow to firm the soil over the seed to further close the furrow and promote favorable seed-to-soil contact.

Figure 3:
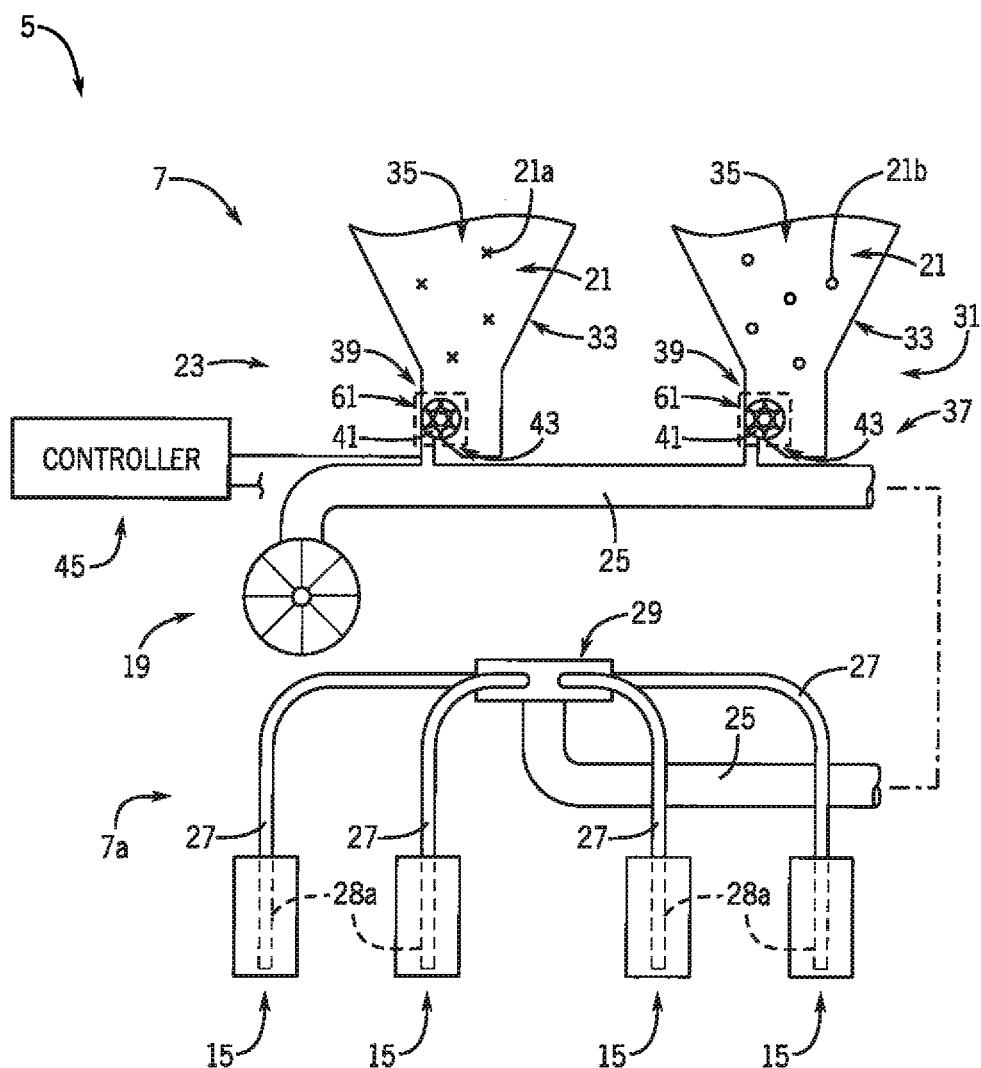
FIG. 3 illustrates a simplified schematic front elevation and cross-sectional representation views portions of the seeder of FIG. 1.
Figure 4A:
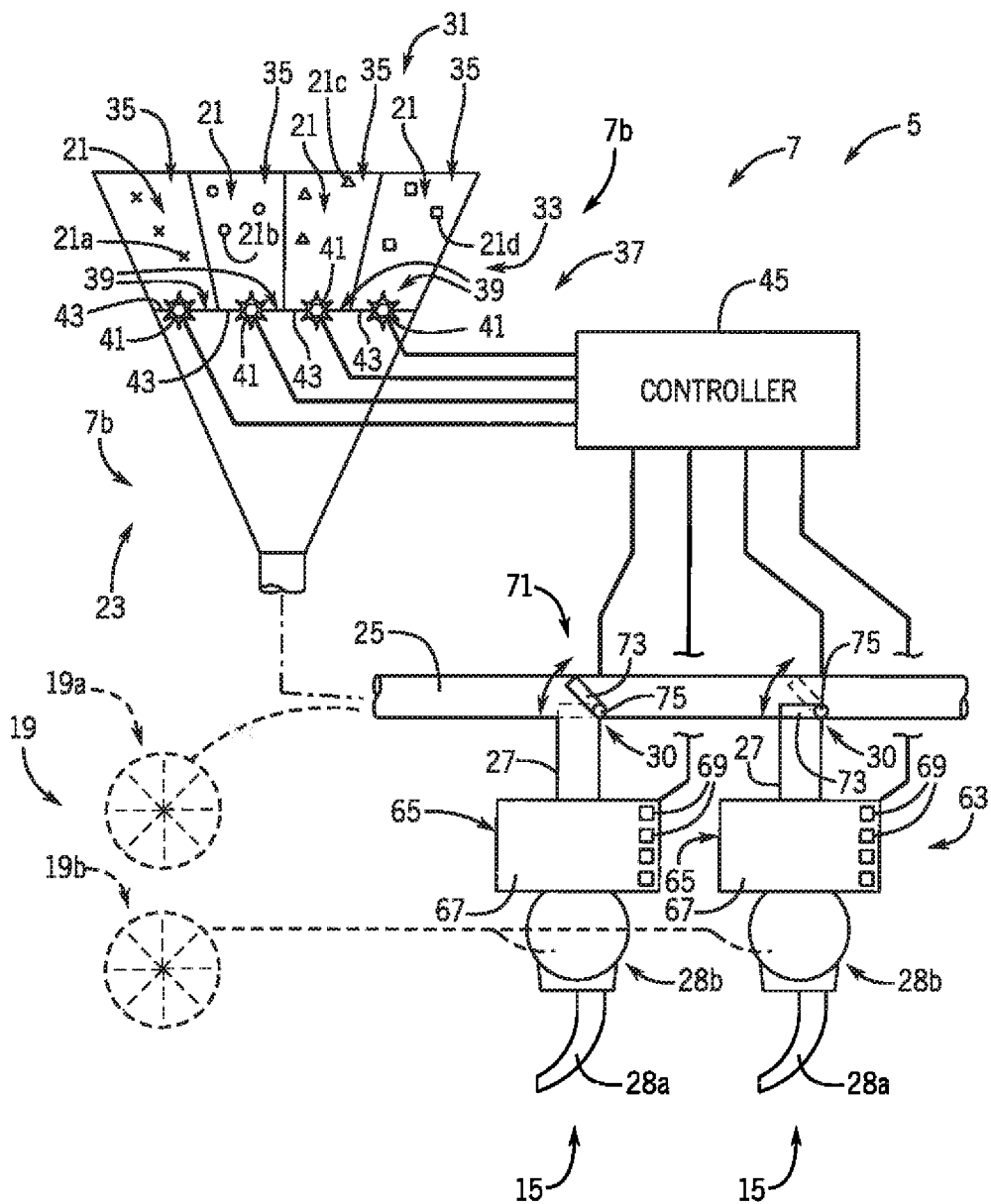
FIG. 4A illustrates a simplified schematic front elevation and cross-sectional representation views portions of the planter of FIG. 2.
Figure 4B:
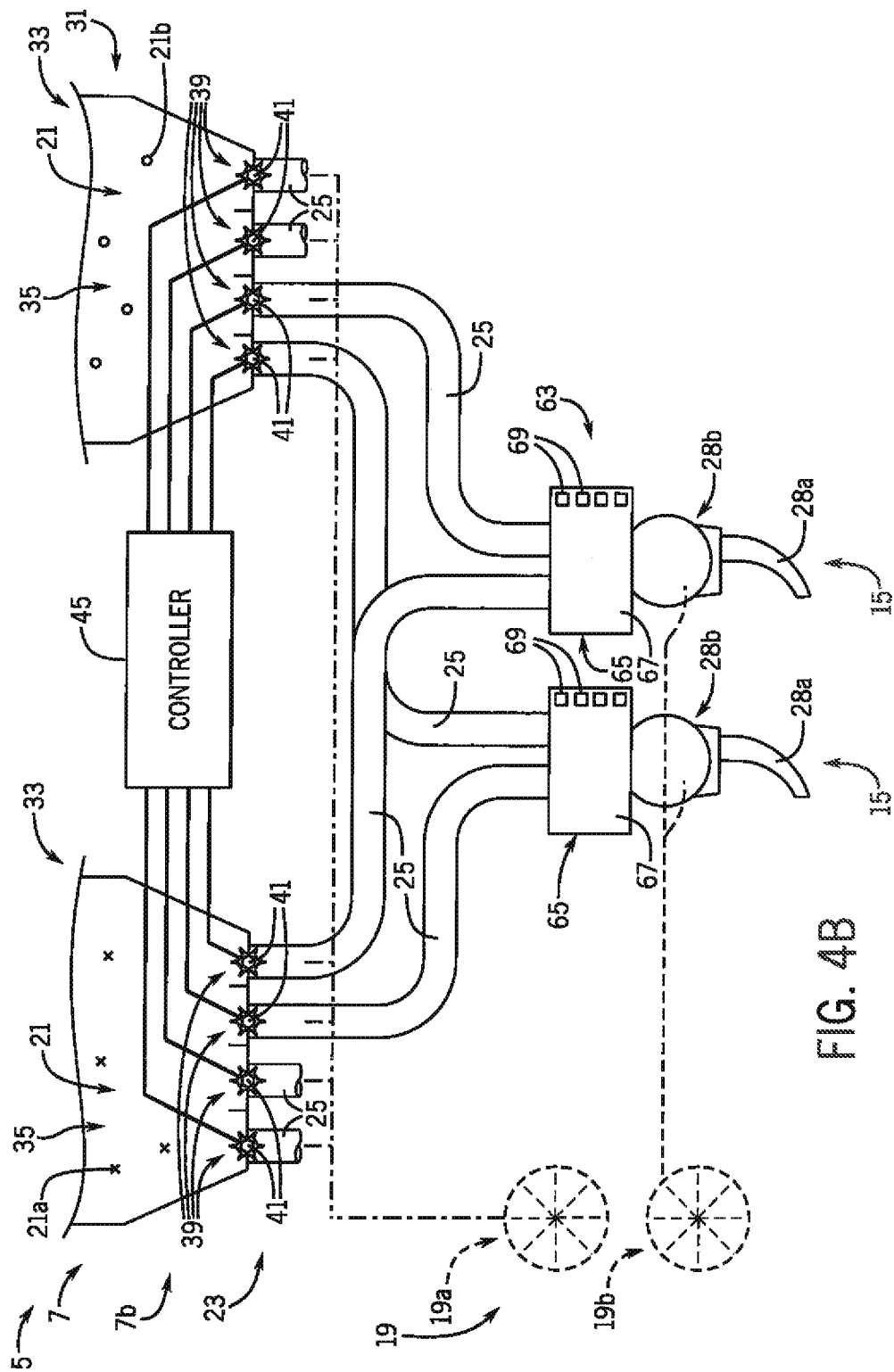
FIG. 4B illustrates a simplified schematic of a variant of the planter of FIG. 4A.

Still referring to FIGS. 1-2, an airflow system 19 provides pneumatic power for use by various implement 7 components and is used to convey seeds 21 through the implement 5 to the row units 15 for release onto the field. Airflow system 19 includes a positive air pressure source and may include a vacuum source for establishing positive and vacuum pressures and corresponding air flows. The positive air pressure source and vacuum sources can be known pumps, fans, blowers, and/or other known airflow system components. Referring now to FIGS. 4A-4B, the airflow system 19 can include a seed conveyance airflow system 19a providing an airflow that entrains seeds 21 to move the seeds 21 from bulk storage to the row units 15 and a seed meter airflow system 19b provides native and/or positive pressure for operation of seed meters at the row units 15, as explained in greater detail elsewhere herein. Each of the seed conveyance and seed meter airflow systems 19a, 19b includes a positive air pressure source(s) and/or vacuum source(s), depending on the particular configurations of the pneumatic system(s) in which they are incorporated. Referring again to FIGS. 1-2, the airflow system 19 such as the seed conveyance airflow system 19a (FIG. 4A-4B) may connect to a seed receiving induction system or bulk metering box(es) or otherwise be operatively connected to a seed-delivery system 23 that has primary lines or primary seed conduits 25 that connect to secondary lines or secondary seed conduits 27 at the row units 15. Referring now to FIG. 3, the seeder 7a includes a manifold 29 that interconnects each primary seed conduit 25 with its corresponding secondary seed conduits 27 that are operably connected to seed tubes 28a that release seeds 21 entrained in an airflow from the seeder 7a to the field.

Referring now to FIG. 4A, the planter 7b has junctions 30 at which the secondary seed conduits 27 branch off from the primary seed conduits 25 for directing seeds 21 to be singulated in seed meters 28b that release individual seeds 21 through the seed tubes 28a to the field. Each seed meter 28b can be a purely mechanical-type seed meter 28b or a pneumatic seed meter 28b. The seed meter 28b includes an internal seed disk that is rotated by a seed disk drive system to rotate at least a surface of the seed disk through a seed pool inside of the seed meter 28b to pick up and singulate seeds from the internal seed pool and convey the individual seeds through the seed meter 28b for individual release out of the seed meter 28b through the seed tube 28a. Pneumatic seed meters 28b of negative pressure types are further operably connected to the seed meter airflow system 19b of the airflow system 19 to provide a vacuum airflow within a vacuum chamber establishing a negative or vacuum pressure within the seed meter 28b opposite the seed pool allowing the seeds to be held against the seed disk by the vacuum pressure. Pneumatic seed meters 28b of positive pressure types are operably connected to the seed meter airflow system 19b to provide a positive airflow and a corresponding positive pressure at the seed side of the seed disk within the seed meter 28b, whereby seeds from the seed pool are pushed and held against the seed disk by positive pressure.

Referring again to FIGS. 1-2, the seeds 21 are held in bulk storage in a bulk storage system 31 with at least one bulk fill hopper 33. FIG. 1 shows one bulk fill hopper 33 used with the seeder 7a, and FIG. 2 shows two central bulk fill hoppers 33 supported by the frame 13 of the planter 7a. The bulk storage system 31 has multiple compartments 35, shown here as spaces within each of the bulk fill hoppers 33 that are separated by divider walls or partitions 36. In another embodiment, the compartments 35 are defined by separate and discrete containers themselves, such as multiple bulk fill hoppers 33 (FIGS. 3 and 4). The different compartments 35 of the hoppers 33 may hold seeds 21 of a common plant type but different varieties or types 21a, 21b, 21c, 21d for planting in different type or variety zones, shown as zones VZ1, VZ2, VZ3, VZ4 in the prescriptions map PM of FIG. 5. The different type or variety zones VZ1, VZ2, VZ3, VZ4 of the agricultural field are defined at least in part by characteristics relating to at least one of soil type and management type. Although the seed 21 may be described elsewhere herein as different types 21a, 21b, 21c, 21d, it is understood that the description of the different types includes different varieties. In other words, the different types 21a, 21b, 21c, 21d of seed 21 include not only different varieties of the same plant species, but also different seed products. Different seed products can include seeds of different species, coated and uncoated seeds, such as insecticide coated and non-insecticide coated seeds. The different seed products can also include refuge in a bag seed and non-refuge in a bag seed, plant-parasite resistant seed and non-plant-parasite resistant seed such as cyst nematodes resistant seeds and non-cyst nematodes resistant seeds, herbicide-tolerant seed and non-herbicide-tolerant seed, or other different products. The different seed products can further include different crop seeds such as corn and soybeans.

Still referring to FIGS. 1-2, a primary delivery system 37 releases or delivers seeds 21, such as by calibrated metering, from bulk storage in the bulk storage system 31 into the seed delivery system 23 for conveyance to the row units 15. Referring now to FIGS. 3-4b, the primary delivery system 37 includes multiple primary delivery assemblies 39. Each primary delivery assembly 39 has a metering roller(s) 41 which may be a calibrated fluted roller arranged at each outlet 43 of the bulk fill hoppers 33 or at each of the separate compartments 35 of a single bulk fill hopper 33 that holds all of the seed types 21a, 21b, 21c, 21d in its separate compartments 35. The rollers 41 are driven to rotate by electronic, pneumatic, or hydraulic motors (not shown) as controlled by the control system 45. The control system 45 is operably connected to rollers 41 for controlling the primary delivery system 37 to deliver seed 21 from the bulk storage system 31 based on look-ahead predictions to coordinate planting seeds 21 of different types 21a, 21b, 21c, 21d into the different zones of the agricultural field, as explained in greater detail elsewhere herein, by synchronizing various switching events manners that minimize mixing different seed types during the switchover(s).

Figure 5:
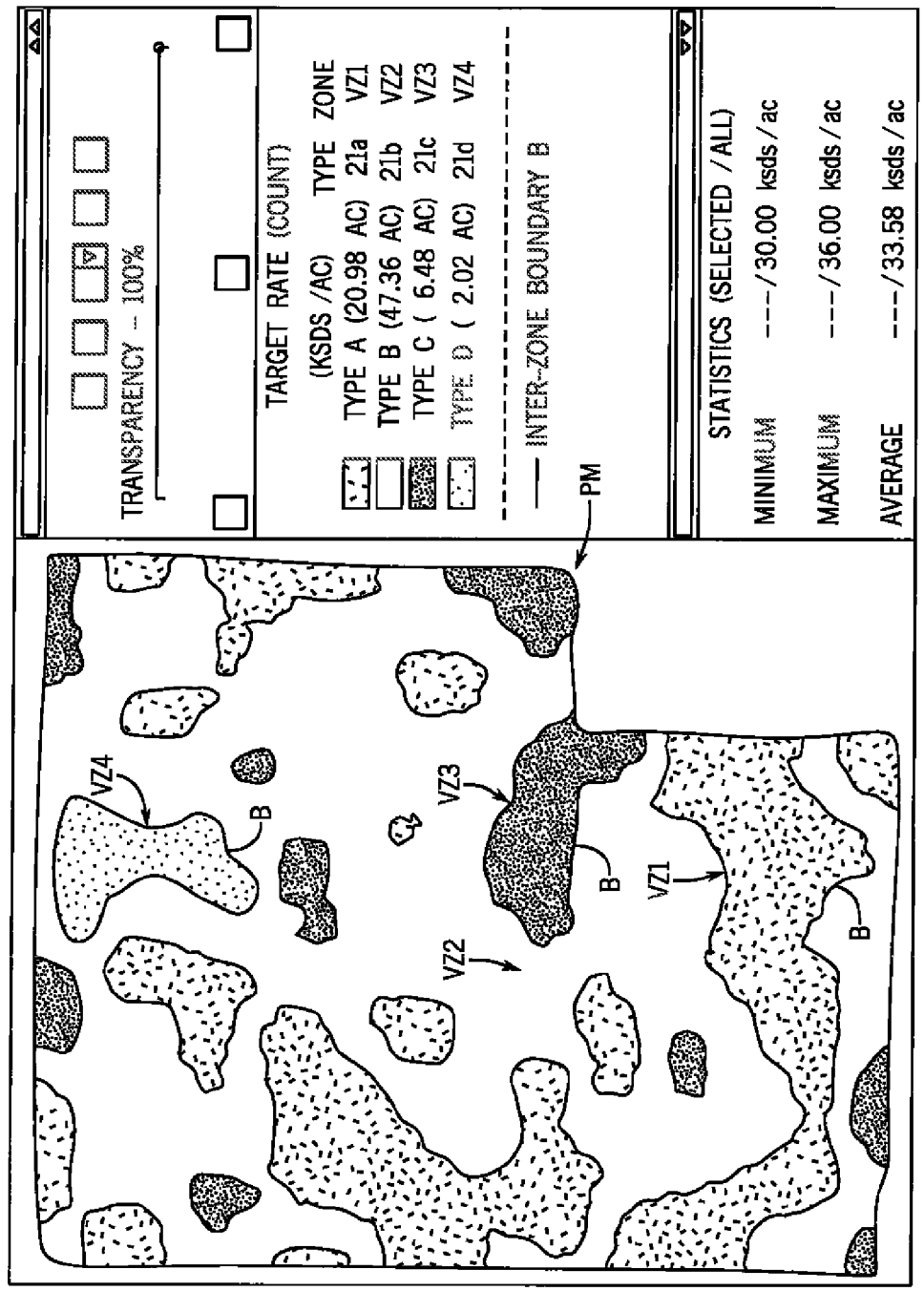
FIG. 5 illustrates is a seed type prescription map for use with implements incorporating the system(s) in accordance with the present invention.

Referring again to FIGS. 1-2, control system 45 includes an implement controller 47 which may be a seeder controller or a planter controller and a tractor controller 49. The components of the control system 45 including the implement and tractor controllers 47, 49 operably communicate with each other, for example, by way of an ISOBUS connection, for coordinating controls of the implement 7 to deliver seeds 21 from the row units 15 based on the type or variety zones VZ1, VZ2, VZ3, VZ4 of the agricultural field, which may correspond to a seed type or variety prescription map PM as shown in FIG. 5. The implement controller 47 is shown including a controller 51 and a power supply 53. The controller 51 of the implement controller 47 can include an industrial computer or, e.g., a programmable logic controller (PLC), along with corresponding software and suitable memory for storing such software and hardware including interconnecting conductors for power and signal transmission for controlling electronic, electro-mechanical, and hydraulic components of the seed delivery system 23 including the primary delivery system 37 and other components of the implement 7 such as the airflow system 19. The tractor controller 49 is configured for controlling operations of the tractor 9 such as controlling steering, speed, braking, shifting, and other operations of the tractor 9. The tractor controller 49 is shown as including a controller 55 and power supply 57. The tractor controller 49 is configured for controlling the functions of the tractor 9 by controlling the various GPS steering, transmission, engine, hydraulic, and/or other systems of the tractor 9. Like the controller 51 of the implement controller 47, the controller 55 of the tractor controller 49 can include an industrial computer or, e.g., a programmable logic controller, along with corresponding software and suitable memory for storing such software and hardware including interconnecting conductors for power and signal transmission for controlling electronic, electro-mechanical, and hydraulic components of the tractor 9. A tractor interface system 59 is operably connected to the tractor controller 49 and includes a monitor and various input devices to allow an operator to see the statuses and to control various operations of the tractor 9 from within the cab of the tractor 9. The tractor interface system 59 may be a MultiControl Armrest™ console available for use with the Maxxum™ or Magnum™ series tractors from Case IH.

Referring again to FIG. 3, in this embodiment with the seeder 7a as implement 7, control system 45 controls rotation of the rollers 41 within metering boxes 61 of the primary delivery assemblies 39. Controlling rotation of the rollers 41 includes controlling rotational characteristics such as starting, stopping, and rotational speed of the rollers 41 to provide selective and calibrated release of the seed types 21a, 21b, 21c, 21d onto the zones VZ1, VZ2, VZ3, VZ4 (FIG. 5). This can be achieved by predicting with the control system 45 when the tractor 9 and/or implement 7 will reach an inter-zone boundary B (FIG. 5) and stopping delivery of a current seed type(s) 21a, 21b, 21c, 21d being delivered in a current zone(s) VZ1, VZ2, VZ3, VZ4 and starting release of a subsequent seed type(s) 21a, 21b, 21c, 21d before reaching the inter-zone boundary B between the current zone(s) VZ1, VZ2, VZ3, VZ4 and a subsequent zone(s) VZ1, VZ2, VZ3, VZ4 being approached, as explained in greater detail elsewhere herein. In some embodiments, one or more of the zones VZ1, VZ2, VZ3, VZ4 is defined to require a predetermined mixture of two or more of the seed types 21a, 21b, 21c, 21d, whereby the control system 45 controls rotation of the rollers 41 to create a purposeful mixture based on the desired predetermined mixture ratio. As one example, the control system 45 delivers a purposeful mixture of 25% seed type 21a and 75% seed type 21b by rotating the respective rollers 41 with a rotational speed differential and proportionally controlling the rotational speeds of the rollers 41 to achieve the 25% seed type 21a and 75% seed type 21b mixture.

Referring again to FIG. 4A, in this embodiment with the planter 7b as implement 7, control system 45 controls rotation of the rollers 41 to control rotational characteristics such as starting, stopping, and rotational speed of the rollers 41 to provide selective and calibrated release of the seed types 21a, 21b, 21c, 21d onto the zones VZ1, VZ2, VZ3, VZ4. This can be achieved by predicting with the control system 45 when the tractor 9 and/or implement 7 will reach an inter-zone boundary B (FIG. 5) and stopping delivery of a current seed type(s) 21a, 21b, 21c, 21d being delivered in a current zone(s) VZ1, VZ2, VZ3, VZ4 and starting release of a subsequent seed type(s) 21a, 21b, 21c, 21d before reaching the inter-zone boundary B between the current zone(s) VZ1, VZ2, VZ3, VZ4 and a subsequent zone(s) VZ1, VZ2, VZ3, VZ4 being approached, as explained in greater detail elsewhere herein. As part of the predictive switchover in this embodiment, the control system 45 may batch pre-feed a required amount of seed 21 needed for a particular zone VZ1, VZ2, VZ3, VZ4 during travel along the travel path, which will be exhausted by release onto the agricultural field as coordinated with the agricultural implement reaching the inter-zone boundary B between the current and next zones VZ1, VZ2, VZ3, VZ4. As described above with respect to FIG. 3, in some embodiments, one or more of the zones VZ1, VZ2, VZ3, VZ4 is defined to require a predetermined mixture of two or more of the seed types 21a, 21b, 21c, 21d, whereby the control system 45 controls the seed-delivery system 23 to simultaneously release seeds 21 of more than one seed type 21a, 21b, 21c, 21d, which may include controlling relative rotational speeds of the rollers 41, to create a purposeful mixture based on the desired predetermined mixture ratio of the more than one seed type 21a, 21b, 21c, 21d for the corresponding zone(s) VZ1, VZ2, VZ3, VZ4.

Still referring to FIG. 4A, control system 45 implements batch feeding by monitoring seed levels of seed 21 held in an on-row storage system 63 and making decisions relating to delivery of seed 21 from the bulk storage system 31 to be held in the on-row storage system 63 for planned depletion of a type(s) of seeds 21a, 21b, 21c, 21d in the on-row storage system 63 before feeding a batch of different type(s) of seeds 21a, 21b, 21c, 21d to the on-row storage system 63. The on-row storage system 63 includes mini-hoppers 65 that may be vented mini-hoppers with chambers 67 receiving seeds 21 from the bulk storage system 31 and perforated lids (not shown) that cover the mini-hoppers and allow air to escape the chambers 67 while seeds 21 collect for temporary storage in the chambers 67 before feeding into the seed meters 28b. Seed level sensors 69 are arranged in the mini-hopper chambers 67 to provide signals allowing the control system 45 to evaluate how much seed 21 of the seed types 21a, 21b, 21c, 21d is in chamber 67 at each of the row units 15. In this way, control system 45 can use signals from the seed level sensors 69 to evaluate current state fill level of a particular seed type 21a, 21b, 21c, 21d relative to how much more seed 21 of that particular type 21a, 21b, 21c, 21d is needed at the corresponding row unit 15 to complete the planting of the current zone(s) VZ1, VZ2, VZ3, VZ4 along the travel path before reaching an approaching inter-zone boundary B for that row unit 15.

Still referring to FIG. 4A, a seed gate system 71 allows for precisely filling batches of seed 21 of a particular type 21a, 21b, 21c, 21d into selected rows of the mini-hoppers 65 as pre-feeding during a fill phase of the system 5 for planned depletion during a seed-out phase. The seed gate system 71 includes a seed gate 73 at each of the junctions 30 that are independently moved by respective actuators 75 which may be electronic, pneumatic, or hydraulic actuators to direct seed 21 into one(s) of the secondary seed conduit(s) 27 of one(s) of the row units 15 for filling the chamber 67 of the respective mini-hopper 65 of the on-row storage system 63. Seed gates 73 are shown as movable between two positions. The first position is represented by the seed gate 73 shown in solid line at the left-most row unit 15. In this first position, the seed gate 73 is fully open to its respective row unit 15 and closed with respect to downstream units 15. Accordingly, at the junction 30 in which the seed gate 73 and is in the first position, seeds 21 are blocked from further downstream flow through the primary seed conduit 25 and directed to flow through the opening of the corresponding secondary seed conduit 27 and into the mini-hopper 65 at the respective row unit 15. The second position is represented by the seed gate 73 shown in solid line at the right-most row unit 15. In this second position, the seed gate 73 is fully closed, preventing seeds 21 to flow through the opening of the corresponding secondary seed conduit 27 at its junction 30, directing all the seeds 21 to flow further downstream through the primary seed conduit 25 toward the next downstream row unit 15.

Still referring to FIG. 4A, this allows the control system 45 to control the seed gate system 71 to fill the mini-hoppers 65 at the row units 15, sequentially one at a time by selectively commanding movements of the seed gates 73 between the open and closed first and second positions. The mini-hoppers 65 can be initially filled by releasing seeds 21 from the bulk fill hopper 33, while the seed gate 73 is in the open first position at the first row unit 15. When the signals from the seed level sensors 69 in the mini-hopper 65 of the first row unit 15 confirm that mini-hopper 65 is full or a less than full desired amount of seeds 21 has been received in the mini-hopper 65, then the control system 45 commands closing of seed gate 73 at the first row unit in opening of the seed gate 73 at the second unit. At this point, seeds 21 bypass the first row unit by flowing across the closed seed gate 73 of the first row unit and are directed into the mini-hopper 65 at the second row unit. This continues until signals from the seed level sensors 69 in the in the mini-hopper 65 of the second row unit 15 confirm that the mini-hopper 65 is full or a less than full desired amount of seeds 21 has been received in the mini-hopper 65 of the second row unit 15. The sequence is repeated for all row units 15. During use of the planter 7b, the control system 45 interrogates the mini-hoppers 65 to evaluate fill levels based on signals from the seed level sensors 69 to determine which row units 15 require additional seed 21 and controls the seed delivery system 23 and the seed gate system 71 to maintain or provide appropriate seed levels in each of the mini-hoppers, based at least in part on the prescriptions map PM (FIG. 5).

Referring now to FIG. 4B, in this embodiment, there is no seed gate system 71, but instead separate delivery hoses, shown as the primary seed conduits 25, extend from each of the primary delivery assemblies 39 for delivery of seeds 21 to each row unit 15. In this way, each metering roller 41 feeds out the seed type 21a, 21b, 21c, 21d from its respective compartment 35 to a primary seed conduit 25 connected to each mini-hopper 65 at each row unit 15. In this way, each mini-hopper 65 has an inlet segment receiving multiple delivery hoses or primary seed conduits 25, with the number of delivery hoses corresponding to the number of seed types 21a, 21b, 21c, 21d in the bulk storage compartment(s) 35. In another embodiment as a variation of that shown in FIG. 4b, there is likewise no seed gate system 71, but instead is a separate delivery hose or conduit that extends from each of the primary delivery assemblies 39 for delivery to a section of multiple row units 15. In this way, each metering roller 41 feeds out the seed type 21a, 21b, 21c, 21d from its respective compartment 35 to a separate delivery hose or conduit that branches off to simultaneously feed a section of multiple mini-hoppers 65 multiple row units 15 within the same section of the planter 7b.

Figure 4C:
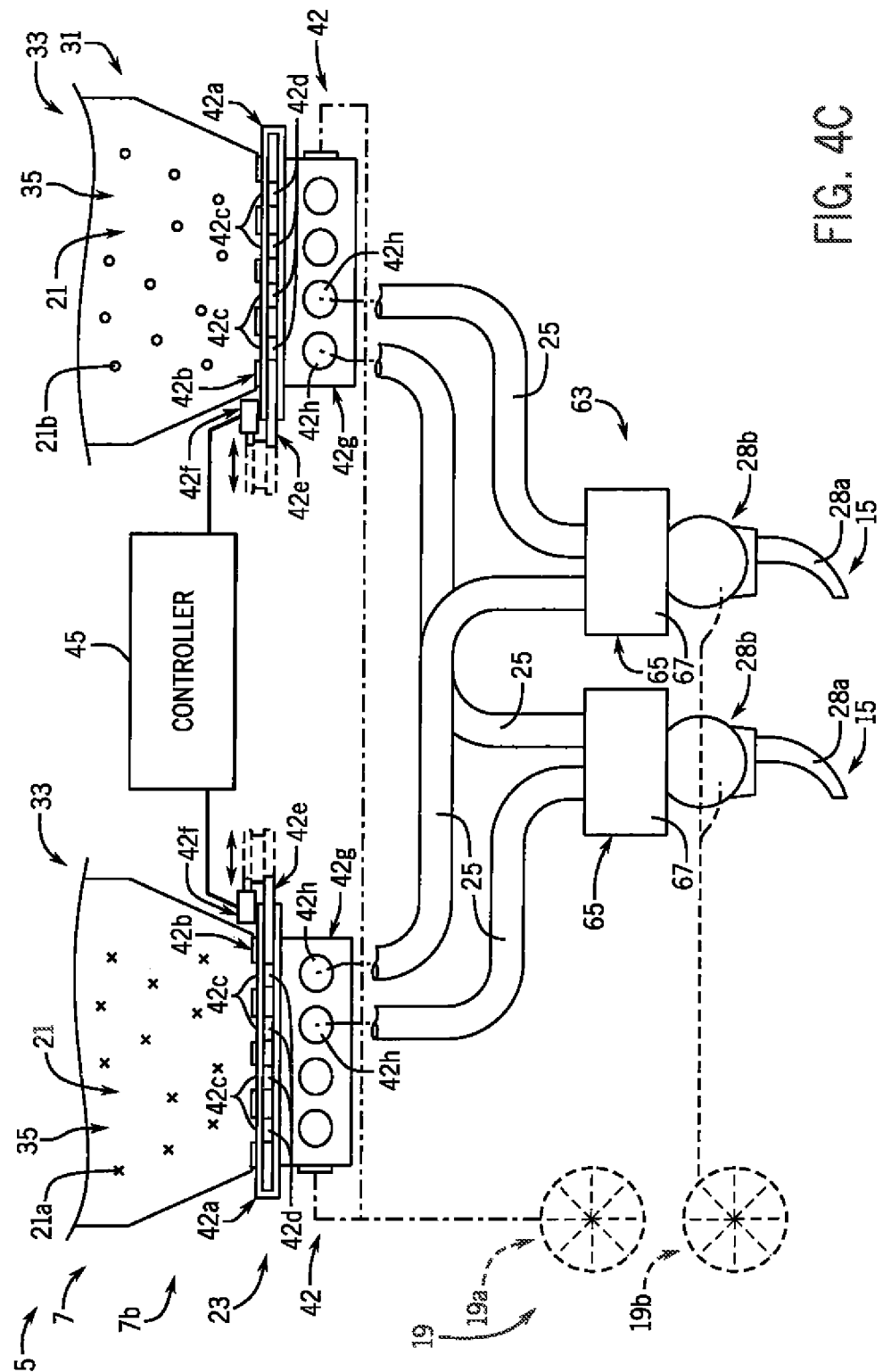
FIG. 4C illustrates a simplified schematic of another variant of the planter of FIG. 4A.

Referring now to FIG. 4C, this embodiment is substantially the same as that shown in FIG. 4B, differing in the following ways. The primary delivery assembly 39 does not use rollers 41 to release seed types 21a, 21b, 21c, 21d from their respective compartment(s) 35 toward the primary seed conduits 25. Instead, an inductor system 42 controls the release of the seed types 21a, 21b, 21c, 21d from their respective compartment(s) 35 toward the primary seed conduits 25. The inductor system 42 has a shut-off system 42a with a grate 42b having openings 42c that align with openings 42d of a sliding seed gate 42e when an actuator 42f moves the seed gate 42e to an open position, as represented in its solid line position in FIG. 4c and as controlled by the control system 45. When the seed gate 42e is in the open position, the seeds 21 flow out of the compartment(s) 35, through the openings of the shut-off system 42a and into an inductor box 42g that receives air from the seed conveyance airflow system 19a and delivers an airflow with entrained seeds 21 through inductor outlets 42h and into the primary seed conduits 25. When the actuator 42f moves the seed gate 42e to a closed position as represented in its dashed line position in FIG. 4c, solid portions of the sliding seed gate 42e block the openings 42c of the grate 42b to close the shut-off system 42a and prevent flow of seeds 21 from the compartment(s) 35 inductor box 42g and thus stops delivery of seeds toward the row units 15.

Figure 4D:
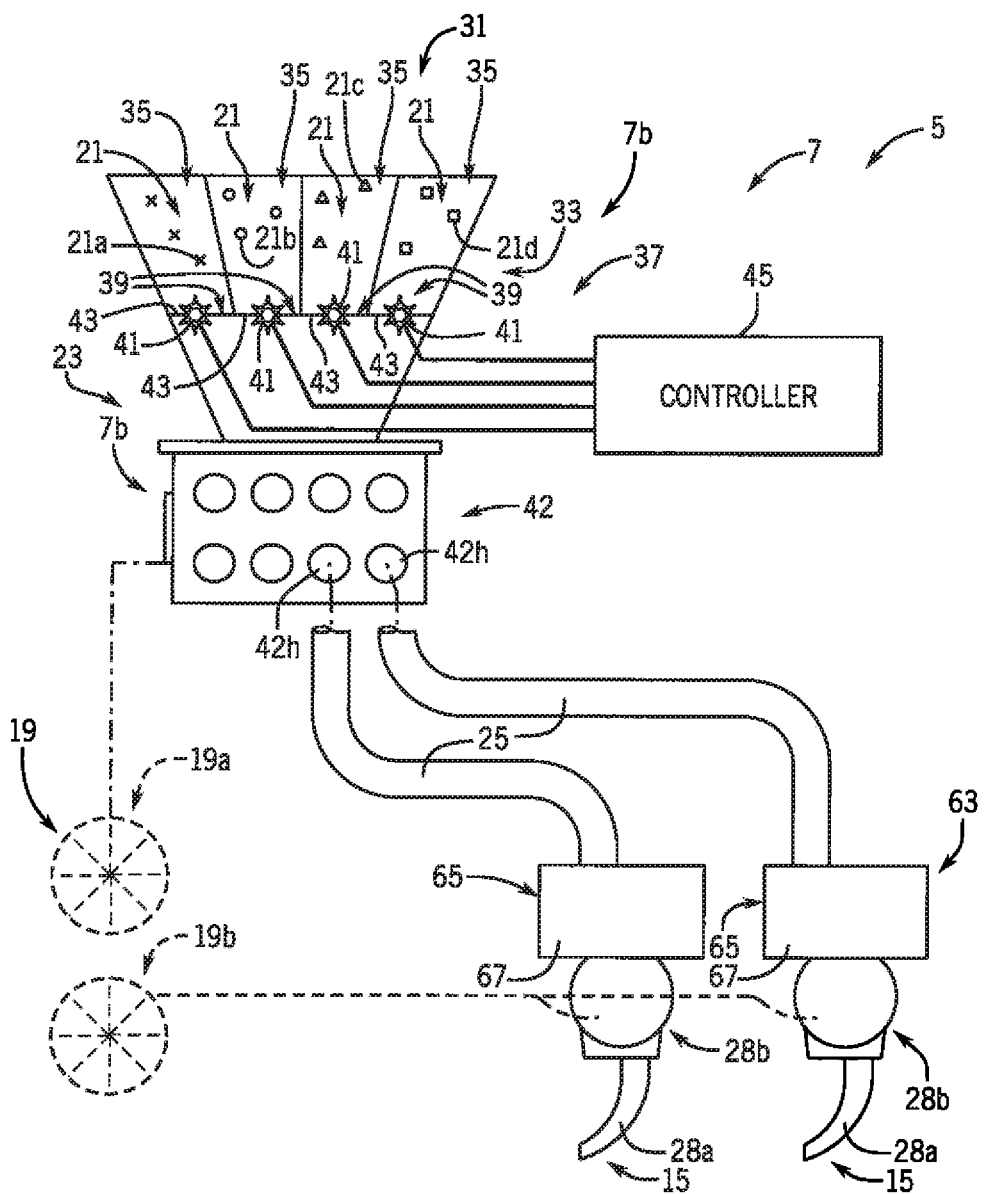
FIG. 4D illustrates a simplified schematic of another variant of the planter of FIG. 4A.

Referring now to FIG. 4D, this embodiment is substantially similar to an implementation of the bulk storage system 31 of FIG. 4A and the on-row storage system 63 and seed meters 28b of FIG. 4C, differing in the following ways. The inductor system 42 is shown simplified, with the rollers 41 performing the main controlled release of seeds 21 from the compartments 35. Each mini-hopper 65 is fed by only a single primary seed conduit 25 from inductor system 42 and thus from the bulk storage system 31.

Referring now to FIGS. 1, 2, and 5, during use, an operator first displays the seed type or variety prescription map PM (FIG. 5) on the computer display or monitor of the tractor interface system 59, which would typically be inside the tractor cab. The prescription map PM displays which type or variety zones VZ1, VZ2, VZ3, VZ4 are located where in the agricultural field and which seed types 21a, 21b, 21c, 21d can be planted in the variety zones VZ1, VZ2, VZ3, VZ4. As shown in FIG. 5, in this embodiment, seed type 21a is shown as acceptable for use in variety zone VZ1, corresponding to a recommended type A. Seed type 21b is shown as acceptable for use in variety zone VZ2, corresponding to a recommended type B. Seed type 21c is shown as acceptable for use in variety zone VZ3, corresponding to a recommended type C. Seed type 21d is shown as acceptable for use in variety zone VZ4, corresponding to a recommended type D. The operator inputs which seed types 21a, 21b, 21c, 21d are stored in the compartments 35 of the bulk storage system 31 through the tractor interface system 59. The prescription map PM may also contain the seed population that is to be planted for each type or variety 21a, 21b, 21c, 21d. The seed population could also be varied within the field based on soil type, organic matter, etc. The size of the seeds can also be input into the tractor interface system 59. This information could also be made available in the database that is built from the desktop software when the prescription map PM was created. The control system 45 looks ahead to predict and control coordinating of seed type delivery switchovers to minimize mixing of different seed types 21a, 21b, 21c, 21d during the switchover, while synchronizing the actual switching of seed type delivered out of the row units 15 with the implement 7 crossing an inter-zone boundary B.

Figure 6:
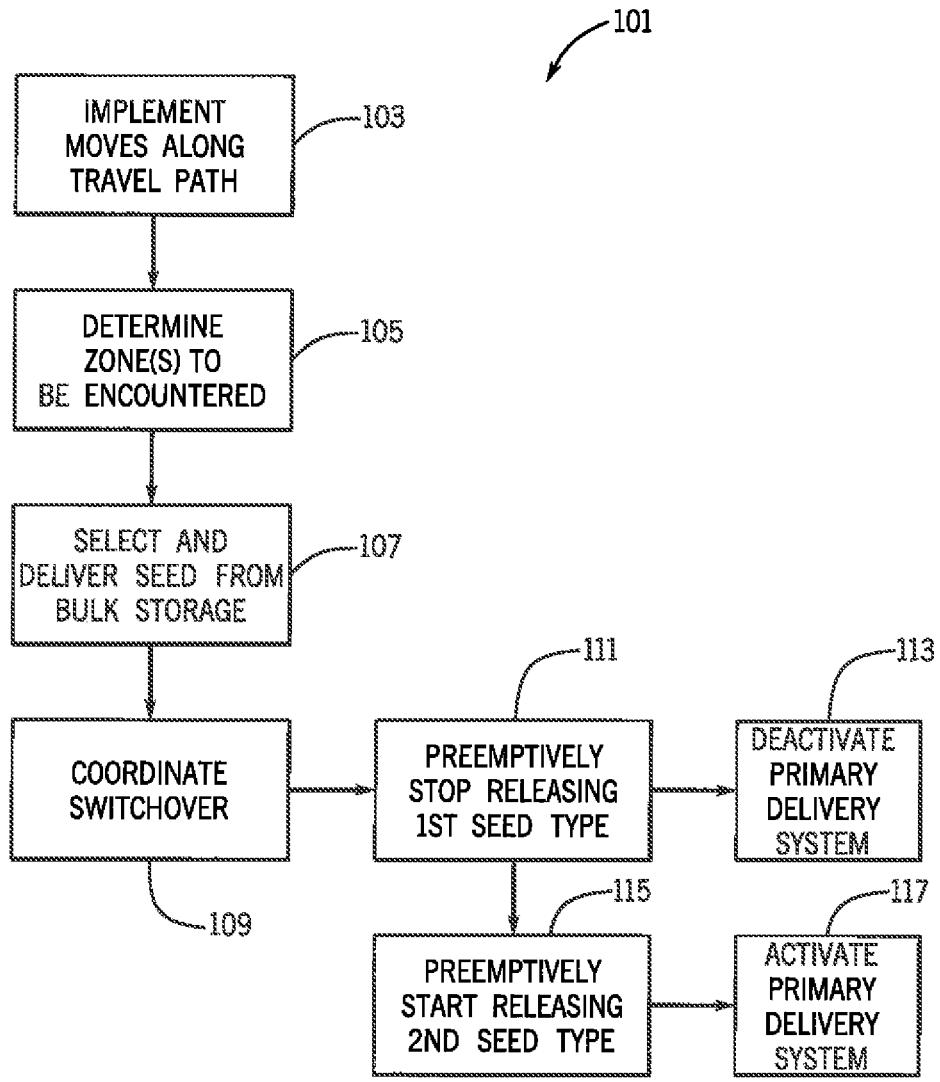
FIG. 6 illustrates schematic diagram of a method of using an implement incorporating the system(s) in accordance with the present invention.

Referring now to FIG. 6 with further reference to FIGS. 1, 2, and 5, the method 101 is shown schematically for the control system 45 looking ahead to synchronize switching of seed types 21a, 21b, 21c, 21d delivered with the implement 7 crossing an inter-zone boundary B. As represented at block 103, the implement 7 moves along a travel path. Control system 45 determines which zones VZ1, VZ2, VZ3, VZ4 will be encountered by the implement 7 while moving along a travel path, as represented at block 105. This may include determining a currently encountered zone VZ1, VZ2, VZ3, VZ4 and a subsequent or next to zone VZ1, VZ2, VZ3, VZ4 that will be crossed if the implement 7 follows the same heading along the travel path. As represented at block 107, seed type(s) 21a, 21b, 21c, 21d is selected by the control system 45 for delivery by the primary delivery system 37. The control system 45 controls the primary delivery assemblies 39 to meter out the corresponding seed type(s) 21a, 21b, 21c, 21d from the bulk storage system 31. The control system 45 monitors the position of the implement 7 relative to an approaching inter-zone boundary B. As represented at block 109, the control system 45 coordinates a switchover to change in which seed type(s) 21a, 21b, 21c, 21d will be delivered from the implement 7. As represented at block 111, before reaching the inter-zone boundary B, the control system 45 commands stopping further release of the currently released seed type(s) 21a, 21b, 21c, 21d from the bulk storage system 31. This may include deactivating the primary delivery system 37 as represented at block 113, such as by stopping rotation of the metering rollers 41 to deactivate the corresponding primary delivery assemblies 39. As represented at block 115, also before reaching the inter-zone boundary B, the control system 45 commands starting release of a next-to-be released seed type(s) 21a, 21b, 21c, 21d from the bulk storage system 31. This may include activating the primary delivery system 37 as represented at block 117, such as by starting rotation of the metering rollers 41 to activate the corresponding primary delivery assemblies 39. In one embodiment, switchovers are achieved substantially exclusively by controlling metering-type calibrated release of seeds 21 from the bulk storage with the primary delivery system. This may include only controlling delivery from outlets of the bulk storage compartments 35 at the delivery assemblies 39, without requiring flow-stopping ancillary gates or valves within the bulk or primary delivery system 37. During the switchover, the control system 45 determines how early to stop releasing seeds of the first type 21a, 21b, 21c, 21d and how early to start releasing seeds of the second or next type 21a, 21b, 21c, 21d based on, for example, values corresponding to estimated distance to the inter-zone boundary B, estimated time until reaching the inter-zone boundary B, and/or estimated number of seeds 21 needed to reach the inter-zone boundary B. These values can be calculated by the control system 45 or stored in lookup tables within the control system 45 in order to provide substantially total seed-out of the first seed type(s) 21a, 21b, 21c, 21d from the row unit 15 before releasing the second or next seed type 21a, 21b, 21c, 21d from the row unit 15. This provides a switchover event defined by substantially discrete sequential applications different seed type(s) 21a, 21b, 21c, 21d, which minimizes mixed deliver of seed type(s) 21a, 21b, 21c, 21d at the inter-zone boundary B.

Referring now to FIG. 6 with further reference to FIGS. 1, 2, and 5, the method 101 is shown schematically for the control system 45 looking ahead to synchronize switching of seed types 21a, 21b, 21c, 21d delivered with the implement 7 crossing an inter-zone boundary B. As represented at block 103, the implement 7 moves along a travel path. Control system 45 determines which zones VZ1, VZ2, VZ3, VZ4 will be encountered by the implement 7 while moving along a travel path, as represented at block 105. This may include determining a currently encountered zone VZ1, VZ2, VZ3, VZ4 and a subsequent or next to zone VZ1, VZ2, VZ3, VZ4 that will be crossed if the implement 7 follows the same heading along the travel path. In one embodiment, the travel path is defined in a path planning strategy selected by the operator. This can be selected or inputted by the operator through the tractor interface system 59. The path planning strategy may provide a layover of the operator's desired travel path over a map of the field such as the prescriptions map PM (FIG. 5). For example, the operator can use the tractor interface system 59 input starting position of the implement 7 and/or tractor 9, and define the travel path segments, including travel direction(s) and turn locations and direction(s), that collectively provide the overall path planning strategy for planting the entire field. Accordingly, the operator can select a predefined path planning strategy or enter a custom path planning strategy. Exemplary path planning strategies include an entirely back-and-forth travel strategy. This may including starting the implement 7 at a selected corner of the field and traveling and seeding or planting along adjacent back-and-forth travel segments along the entire length or width of the field, making 180° turns at the headlands of the field, until the entire field has been seeded or planted. Other exemplary path planning strategies include initially seeding or planting the headlands, followed by a back-and-forth travel strategy. This may include starting the implement 7 at a selected corner of the field and traveling around the entire perimeter of the field, seeding or planting the headlands in a single perimeter lap around the field or more than one concentrically inwardly spiraling perimeter laps around the field. After the headlands are seeded or planted, the implement 7 may start at an unseeded or unplanted corner nearest the starting corner and seed or plant along adjacent back-and-forth travel segments along the entire width or length of the field, making 180° turns at the headlands of the field, until the entire field has been seeded or planted. Other path planning strategies may include diagonal travel path segments, seeding or planting toward a middle portion of the field before other portions, or others. Regardless of the particular path planning strategy, the control system 45 uses the path planning strategy to make look-ahead predictions and control coordinated seed type delivery switchovers events for reducing mixing of different seed types during the switchover(s). If desired, the operator can change the path planning strategy during a seeding or planting session by inputting such changes through the tractor interface system 59 to redefine or revise the path planning strategy. As represented at block 107, seed type(s) 21a, 21b, 21c, 21d is selected by the control system 45 for delivery by the primary delivery system 37. The control system 45 controls the primary delivery assemblies 39 to meter out the corresponding seed type(s) 21a, 21b, 21c, 21d from the bulk storage system 31. The control system 45 monitors the position of the implement 7 relative to an approaching inter-zone boundary B. As represented at block 109, the control system 45 coordinates a switchover to change which seed type(s) 21a, 21b, 21c, 21d will be delivered from the implement 7. As represented at block 111, before reaching the inter-zone boundary B, the control system 45 commands stopping further release of the currently released seed type(s) 21a, 21b, 21c, 21d from the bulk storage system 31. This may include deactivating the primary delivery system 37 as represented at block 113, such as by stopping rotation of the metering rollers 41 to deactivate the corresponding primary delivery assemblies 39. As represented at block 115, also before reaching the inter-zone boundary B, the control system 45 commands starting release of a next-to-be released seed type(s) 21a, 21b, 21c, 21d from the bulk storage system 31. This may include activating the primary delivery system 37 as represented at block 117, such as by starting rotation of the metering rollers 41 to activate the corresponding primary delivery assemblies 39. In one embodiment, switchovers are achieved substantially exclusively by controlling metering-type calibrated release of seeds 21 from the bulk storage with the primary delivery system. This may include only controlling delivery from outlets of the bulk storage containers 33 at the delivery assemblies 39, without requiring flow-stopping ancillary gates or valves within the bulk or primary delivery system 37. During the switchover, the control system 45 determines how early to stop releasing seeds of the first type 21a, 21b, 21c, 21d and how early to start releasing seeds of the second or next type 21a, 21b, 21c, 21d based on, for example, values corresponding to estimated distance to the inter-zone boundary B, estimated time until reaching the inter-zone boundary B, and/or estimated number of seeds 21 needed to reach the inter-zone boundary B. These values can be calculated by the control system 45 or stored in lookup tables within the control system 45 in order to provide substantially total seed-out of the first seed type(s) 21a, 21b, 21c, 21d from the row unit 15 before releasing the second or next seed type 21a, 21b, 21c, 21d from the row unit 15. This provides a switchover event defined by substantially discrete sequential applications of different seed type(s) 21a, 21b, 21c, 21d, which minimizes mixed deliver of seed type(s) 21a, 21b, 21c, 21d at the inter-zone boundary B.

Figure 7:
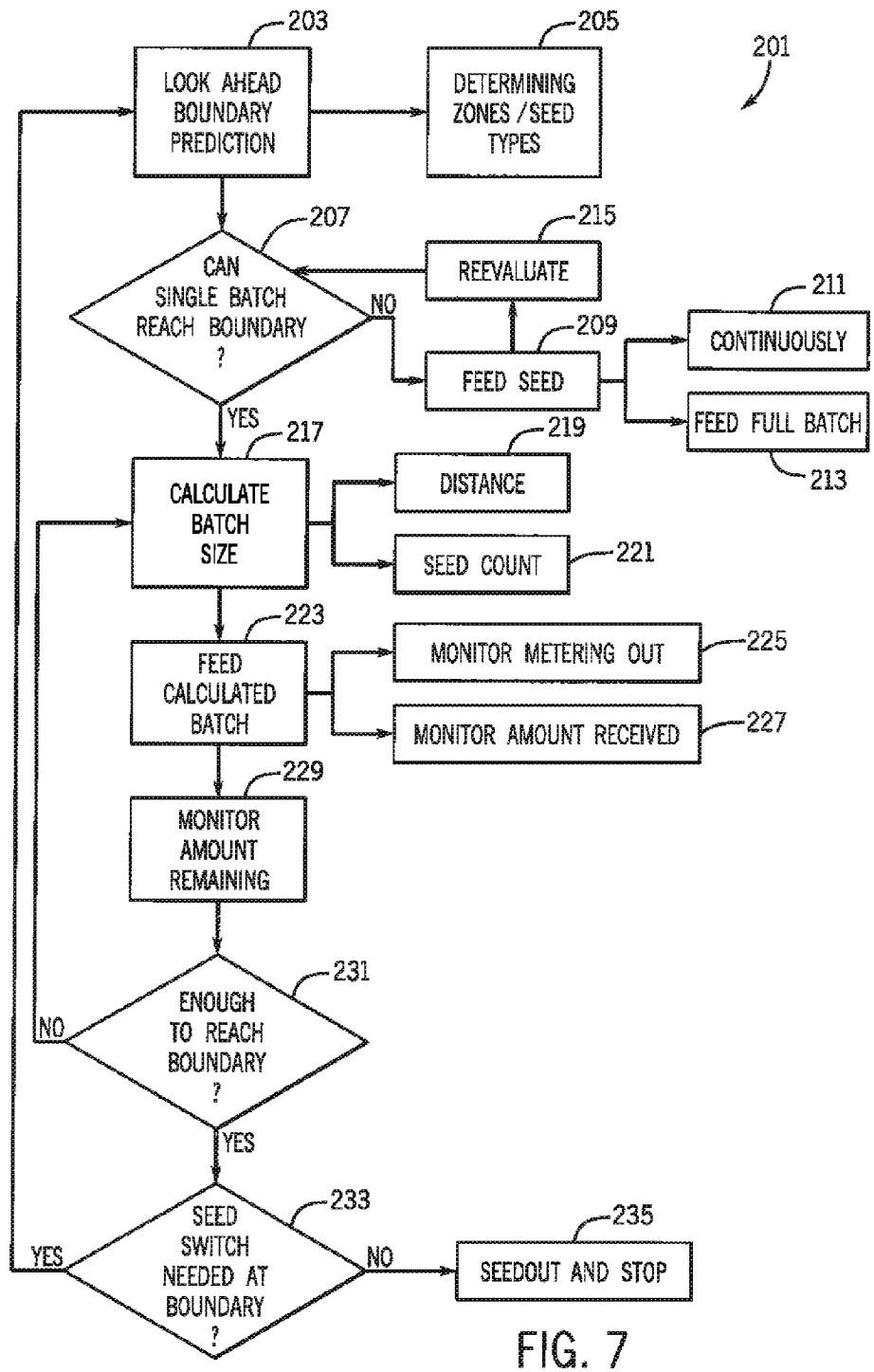
FIG. 7 illustrates schematic diagram of a variant of the method FIG. 6.

Referring now to FIG. 7 with further reference to FIGS. 2, 4a, 4b, and 5, a method 201 is shown schematically for the control system 45 looking ahead to synchronize switching of seed types 21a, 21b, 21c, 21d delivered with a planter 7b. As represented at blocks 203 and 205, the control system 45 looks ahead to determine what seed types 21a, 21b, 21c, 21d to plant in what order based on when the planter 7b and each of the individual row units 15 or sections will cross inter-zone boundaries B. The control system 45 refers to the operator's selected or defined path planning strategy as described above with respect to FIG. 6, equally applicable here, to make look-ahead predictions and issue corresponding control commands to the implement 7. As represented at block 207, based on a prescription map PM and path planning strategy, the control system 45 determines whether a single batch of seed 21, such as by feeding enough seed 21 to fully fill the mini-hopper 65. As represented at block 209, if a single batch of seed 21 is determined to not provided enough seed for the planter 7b to reach the inter-zone boundary B, then the control system 45 commands feeding of seed 21 either continuously or by discrete batch delivery out of the bulk storage system 31, as represented by blocks 211 and 213. As represented at block 215, the control system 45 reevaluates whether a single batch of seed 21 can provide enough seed 21 for the planter 7b to reach the inter-zone boundary B. As represented at block 217, if the control system 45 determines that a single batch can provide enough seed 21 for the planter 7b to reach the inter-zone boundary B, then the control system 45 calculates an exact amount of the particular seed type 21a, 21b, 21c, 21d required to reach the inter-zone boundary B. As represented at blocks 219 and 221, this can be based on, for example, values corresponding to distance remaining until reaching the inter-zone boundary B, time until reaching the inter-zone boundary B, and/or number of seeds 21 needed to reach the inter-zone boundary B. These values can be calculated by the control system 45 or stored in lookup tables within the control system 45. As represented at block 223, seeds 21 of the calculation batch size corresponding to the exact amount needed to reach the inter-zone boundary B are fed from the bulk storage system 31 to the on-row storage system 63. This may be done by activating the respective primary delivery assembly 39 to rotate the roller 41 for a duration of time or number of rotations that meters out the exact calibrated amount that was calculated as represented at block 225. This may also be done by activating the respective primary delivery assembly 39 to rotate the roller 41 until the seed of the sensor 69 provide a signal indicative of the calculated amount being received in the mini-hoppers 65, as represented at block 227. As represented at blocks 229, 231, the control system 45 monitors how much seed 21 remains in the on-row storage system 63 and recalculates whether there is enough seed 21 in the on-row storage system 63 to reach the inter-zone boundary B, which may include evaluating signals from the seed level sensor 69 in the mini-hoppers 65. If there is not enough seed 21 to reach the inter-zone boundary B, then a new calculation is made for the batch size according to block 217. If there is enough seed 21 in the on-row storage system 63 to reach the inter-zone boundary B, then the control system 45 evaluates whether a seed switchover to a different seed type(s) 21a, 21b, 21c, 21d is needed at the inter-zone boundary B, as represented at block 233. If a switchover to a different seed type(s) 21a, 21b, 21c, 21d is needed at the inter-zone boundary B, the control system 45 looks ahead to make boundary predictions as represented at block 203 and the process repeats. If there is enough seed 21 in the on-row storage system 63 to reach the inter-zone boundary B and a switchover to a different seed type(s) 21a, 21b, 21c, 21d is not needed, then the control system 45 evaluates whether the planting session will be completed, as represented at block 253, at which point no more seed 21 will be delivered out of the bulk storage system 31 and the row unit(s) 15 will seed-out and the planting session may be finished.

Thus, in one embodiment, when the planter 7b first starts in the field, the bulk tank compartment 35 containing the seed type 21a, 21b, 21c, 21d that is to be planted first feeds the correct amount of seed 21 to each row unit 15 seed meter 28b. This may be done by activating the primary delivery system 37 to deliver a calibrated amount of the seed type 21a, 21b, 21c, 21d to the mini-hopper 65 at each row unit 15. The amount of seed 21 necessary for each individual row unit 15 can be calculated based on the prescription map PM (FIG. 5) and the known population. The seed level sensors 69 in the seed reservoir or chamber 67 of the mini-hopper 65 are used to determine the amount of seed 21 in each seed reservoir or chamber 67. Once the proper amount of seed 21 is fed into the meter reservoir of chamber 67 of the mini-hopper 65, a gate located at the bulk tank compartment 35 is shut or the roller 41 is deactivated and stopped for that particular row unit 15. If there is not enough seed 21 in the reservoir or chamber 67 of the mini-hopper 65 to plant this seed type 21a, 21b, 21c, 21d before it has to switch, the gate remains open or the roller 41 remains activated and rotating until the planter 7b reaches a point where the control system 45 determines that the reservoir or chamber 67 of the mini-hopper 65 has enough seed 21 to reach the inter-zone boundary B of the next seed type 21a, 21b, 21c, 21d for that particular row. When the planter row unit 15 reaches the boundary B for the next seed type 21a, 21b, 21c, 21d, almost all of the seed 21 in the reservoir or chamber 67 of the mini-hopper 65, for example only enough seed 21 to plant about another 5 feet or less, such as less than about 3 feet. As soon as this occurs, the gate for the next seed variety 21a, 21b, 21c, 21d is opened or the roller 41 for the next seed variety 21a, 21b, 21c, 21d is activated to rotate and the process is repeated.

The control system 45 can be configured to individually control each of the row units 15, including looking ahead and predictively control feeding of seeds 21 to each individual row unit 15 independently of the other row units 15 in this way to look ahead and control switching from delivering seeds 21 of a first type(s) 21a, 21b, 21c, 21d to seeds of another type(s) 21a, 21b, 21c, 21d on a per-row basis. In another embodiment, the control system 45 is configured to look ahead and predictively control feeding seeds 21 to groups of row units 15 in the same way within the same section of the planter 7b, for example, by giving simultaneous common commands for filling all of the mini-hoppers 65 within the same outer wing section(s) and/or inner or middle sections. This allows the control system 45 to control switching from delivering seeds 21 of a first type(s) 21a, 21b, 21c, 21d to seeds of another type(s) 21a, 21b, 21c, 21d from the planter 7b on a per-section basis. In yet another embodiment, the control system 45 is configured to look ahead and predictively control feeding seeds 21 to all of row units 15 of the planter 7b in the same way. This allows for controlling switching from delivering seeds 21 of a first type(s) 21a, 21b, 21c, 21d to seeds of another type(s) 21a, 21b, 21c, 21d on a whole-planter basis.

Many changes and modifications could be made to the invention without departing from the spirit thereof. The scope of these changes will become apparent from the appended claims.

We claim:

1. A method of delivering multiple types of seed onto an agricultural field with an agricultural implement, the agricultural implement including a row unit having a seed meter associated therewith for singulation and individual release of seeds onto the agricultural field, the method comprising:
   moving an implement along a travel path through multiple zones including at least a first zone and a second zone of an agricultural field, wherein each of the multiple zones corresponds to a characteristic of the agricultural field relating to at least one of soil type and management type;
   storing multiple types of seeds in a bulk storage system;
   selectively releasing seeds of the multiple types including at least a first type and a second type from the bulk storage system to the seed meter of the agricultural implement and from the seed meter onto the agricultural field at the first and second zones by switching from releasing seeds of the first type from the seed meter to releasing seeds of the second type from the seed meter at a boundary defined between the first and second zones; and
   coordinating the switching, from releasing seeds of the first type from the seed meter to releasing seeds of the second type from the seed meter through a controlled predicted exhaustion of seeds of the first type downstream of the bulk storage system storing the seeds of multiple types, the coordinating the switching including:
      preemptively deactivating a primary delivery system preventing further delivery of the seed of the first type from the bulk storage system before the agricultural implement reaches the boundary; and
      preemptively activating the primary delivery system to initiate delivery of the seed of the second type from the bulk storage system before the agricultural implement reaches the boundary such that the initial release of the seed on the second type out of the agricultural implement is coordinated with the agricultural implement crossing the boundary between the first and second zones;
   wherein:
      the bulk storage system is connected to the seed meter by a flow path; and
      the seeds of the each of the multiple types travel along at least a portion of the flow path from the bulk storage system to the seed meter.

2. The method of claim 1 further comprising determining a required amount of seed of the first or second type needed to deliver onto a portion of the agricultural field while the agricultural implement travels along a travel path through one of the first and second zones and delivering the required amount with the primary delivery system for temporary storage of the first or second type on the agricultural implement downstream during release of the seed of the first or second type onto the agricultural field.

3. The method of claim 2 wherein the agricultural implement is a planter including multiple row units having mini-hoppers, and the method further includes delivering seeds of one of the multiple types to the mini-hoppers and delivery of the seeds from the mini-hoppers to seed meters at the row units for singulation and individual release onto the agricultural field.

4. The method of claim 3 wherein seed level sensors are arranged with respect to the mini-hoppers for detecting amounts of seeds in chambers of the mini-hoppers and the method further includes activating the primary delivery system to deliver seed of the first or second type to the mini-hoppers until the seed level sensors provide a signal indicating the required amount of seed of the first or second type is within the mini-hoppers.

5. The method of claim 1 wherein the primary delivery system includes first and second primary delivery assemblies, and the method further includes activating the first primary delivery assembly to deliver seeds of the first variety from the bulk storage system for release from the agricultural, implement and activating the second primary delivery assembly to deliver seeds of the second variety from the bulk storage system for release from the agricultural implement.

6. The method of claim 5 wherein the first and second primary delivery assemblies include rollers and wherein, the method further includes rotating the rollers during activation of the first and second primary delivery assemblies to deliver seeds of the first and second types from the bulk storage system.

7. The method of claim 6 further comprising stopping rotation of the rollers when the first and second primary delivery assemblies are deactivating to prevent delivery of the seeds of the respective first and second types out of the corresponding one of the first and second compartments of the bulk storage system.

8. The method of claim 7 wherein the rollers of the first and second primary delivery assemblies are arranged in outlets of first and second compartments of the bulk storage system respectively storing seeds of the first and second types and wherein the method further comprising rotating and stopping rotation of the rollers to selectively deliver seeds of the first and second types out of the outlets of the first and second compartments of the bulk storage system.

9. A method of delivering multiple types of seed onto an agricultural field with an agricultural implement, the agricultural implement including a row unit having a seed meter associated therewith for singulation and individual release of seeds onto the agricultural field, the method comprising:
   moving an implement along a travel path through a first zone of an agricultural field, wherein the first zone corresponds to a first characteristic of the agricultural field relating to at least one of soil type and management type;
   activating a first primary delivery assembly to deliver seeds of a first type from a first compartment of a bulk storage system through a flow path for release onto the agricultural field by the seed meter;
   identifying an approaching boundary to be crossed by the agricultural implement moving along the travel path, the boundary defined between the first zone and a second zone of the agricultural field, wherein the second zone corresponds to a second characteristic of the agricultural field relating to at least one of soil type and management type;
   deactivating the first primary delivery assembly before the implement crosses the boundary between the first and second zones to stop delivery of the seeds of the first type from the first compartment through the flow path before the implement crosses the boundary between the first and second zones; and
   activating a second primary delivery assembly to deliver seeds of a second type from a second compartment of a bulk storage system through the flow path for initial release onto the agricultural field by the seed meter at a time that corresponds to the implement crossing the boundary between the first and second zones.

10. The method of claim 9 wherein the first and second primary delivery assemblies include rollers and wherein the method further includes rotating the rollers during activation of the first and second primary delivery assemblies to deliver seeds of the first and second types from the bulk storage system.

11. The method of claim 10 further comprising stopping rotation of the rollers when the first and second primary delivery assemblies are deactivating to prevent delivery of the seeds of the respective first and second types out of the corresponding one of the first and second compartments of the bulk storage system.

12. The method of claim 11 wherein the rollers of the first and second primary delivery assemblies are arranged in outlets of the first and second compartments of the bulk storage system and wherein the method further comprising rotating and stopping rotation of the rollers to selectively deliver seeds of the first and second types out of the outlets of the first and second compartments of the bulk storage system.

13. An agricultural implement with a system for delivering multiple types of seed onto an agricultural field, the agricultural implement including a row unit having a seed meter associated therewith for singulation and individual release of seeds onto the agricultural field, the implement comprising:
a bulk storage system including a first compartment storing seeds of a first type and a second compartment storing seeds of a second type;
a primary delivery system including a first primary delivery assembly arranged with respect to the first compartment to selectively deliver the seeds of the first type through a flow path for release onto the agricultural field by a seed meter and a second primary delivery assembly arranged with respect to the second compartment to selectively deliver the seeds of the second type through the flow path for release onto the agricultural field by the seed meter;
a control system operably connected to the primary delivery system and configured to,
activate the first primary delivery assembly while the agricultural implement travels along a travel path through a first zone of an agricultural field, wherein the first zone corresponds to a first characteristic of the agricultural field relating to at least one of soil type and management type;
identify an approaching boundary to be crossed by the agricultural implement moving, along the travel path, the boundary defined between the first zone and a second zone of the agricultural field, wherein the second zone corresponds to a second characteristic of the agricultural field relating to at least one of soil type and management type;
deactivate the first primary delivery assembly before the agricultural implement crosses the boundary between the first and second zones to stop delivery of the seeds of the first type from the first compartment through to the seed meter before the agricultural implement crosses the boundary between the first and second zones; and
activate the second primary delivery assembly to deliver seeds of the second type from the second compartment to the seed meter for initial release of the seeds of the second type onto the agricultural field at a time that corresponds to the agricultural implement crossing the boundary between the first and second zones.

14. The agricultural implement of claim 13 wherein each of the first and second primary delivery assemblies further comprises a roller that rotates while the respective first and second primary delivery assembly is activated to deliver the seeds of the respective first and second types out of the corresponding one of the first and second compartments of the bulk storage system.

15. The agricultural implement of claim 14 wherein the roller of each of the first and second primary delivery assemblies does not rotate while the respective first and second primary delivery assembly is deactivated to prevent delivery of the seeds of the respective first and second types out of the corresponding one of the first and second compartments of the bulk storage system.

16. The agricultural implement of claim 15 wherein the rollers of the first and second primary delivery assemblies are arranged in outlets of the first and second compartments of the bulk storage system.

17. The agricultural implement of claim 13 wherein the agricultural implement is a seeder and the first and second primary delivery assemblies include metering boxes having calibrated fluted metering rollers.

18. The agricultural implement of claim 13 wherein the agricultural implement is a planter including an on-row storage system receiving seeds from the primary delivery system and multiple row units supporting corresponding seed meters receiving seeds from the on-row storage system for singulating and delivering the seeds to the agricultural field.

19. The agricultural implement of claim 18 wherein the on-row storage system includes mini-hoppers at the multiple row units having chambers receiving seeds from the primary delivery system and providing seeds to the seed meters, wherein the control system includes seed level sensors arranged with respect to the mini-hoppers for detecting amounts of seeds in the chambers of the mini-hoppers.

20. The agricultural implement of claim 13 wherein each of the first and second primary delivery assemblies further comprises a roller that rotates while the respective first and second primary delivery assembly is activated to deliver the seeds of the respective first and second types out of the corresponding one of the first and second compartments of the hulk storage system and the primary delivery system includes an inductor system directing seeds delivered by the roller of the respective first and second primary delivery assembly into at least one primary seed conduit guiding the seeds away from the bulk storage system.

* * * * *